UNITED STATES PATENT OFFICE.

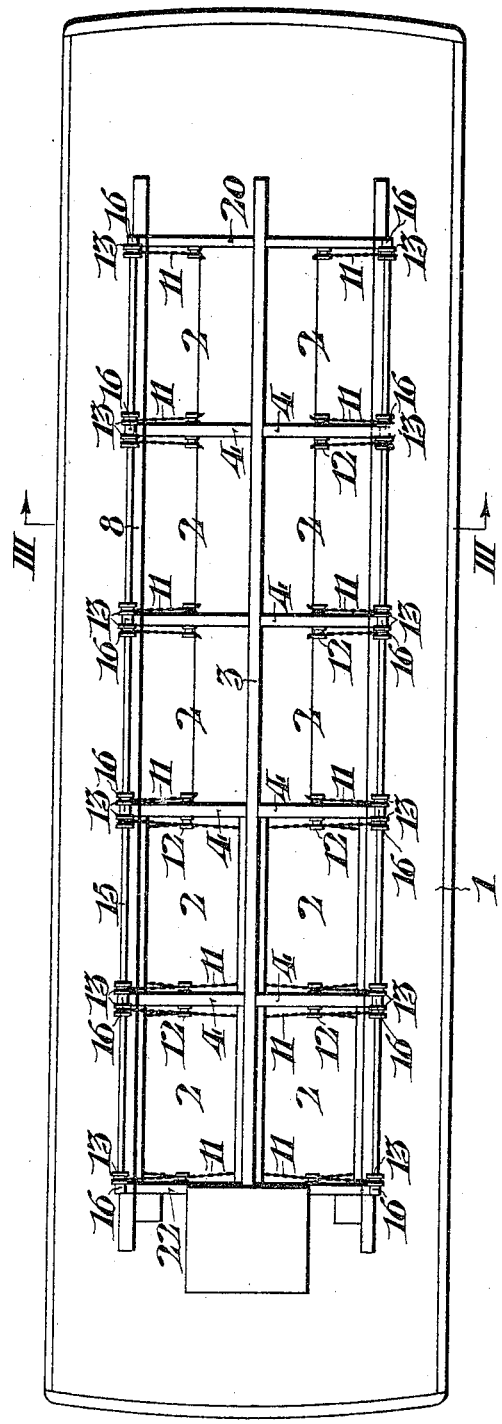
W. W. ROBINSON.
DUMPING SCOW.
APPLICATION FILED NOV. 18, 1908.
950,242.
Patented Feb. 22, 1910.
2 SHEETS—SHEET 1.
FIG. I.
WITNESSES:
INVENTOR:
WILLIAM W. ROBINSON, W. W. ROBINSON.
DUMPING SCOW.
APPLICATION FILED NOV. 18, 1908.
950,242.
Patented Feb. 22, 1910.
2 SHEETS—SHEET 2.
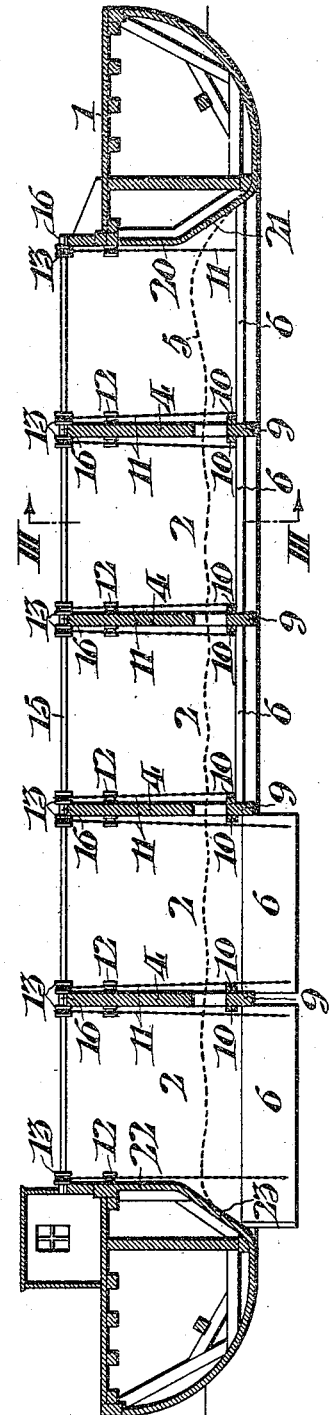
FIG. II.
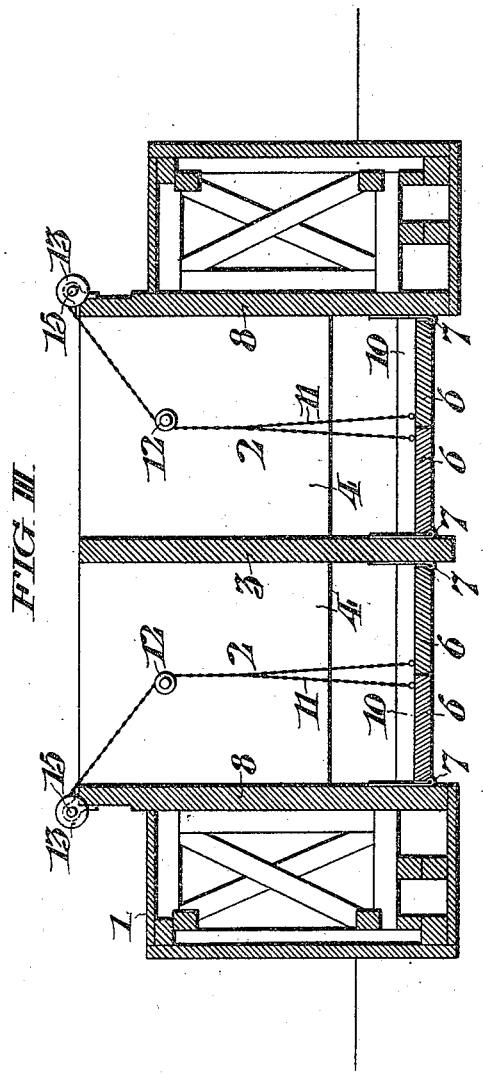
FIG. III.
WITNESSES:
John C. Bergner
James H. Bell
INVENTOR:
WILLIAM W. ROBINSON,
by his attorneys
Tilley + Paul

WILLIAM W. ROBINSON, OF PHILADELPHIA, PENNSYLVANIA, ASSIGNOR OF ONE-HALF TO JOHN H. MATHIS, OF PRIMOS, PENNSYLVANIA.

DUMPING-SCOW.

950,242.  Specification of Letters Patent.  Patented Feb. 22, 1910.

Application filed November 18, 1908. Serial No. 463,164.

*To all whom it may concern:*

Be it known that I, WILLIAM W. ROBINSON, of Philadelphia, in the county of Philadelphia and State of Pennsylvania, have invented certain new and useful Improvements in Dumping-Scows, whereof the following is a specification, reference being had to the accompanying drawings.

My invention relates to a dumping scow provided with means whereby the motion of the scow cleans its compartments from floating matter after the scow has been dumped. The removal of floating matter from the compartments of dumping scows is a problem which has engaged the attention of those constructing such scows, but hitherto no satisfactory solution has been found. The difficulty is that as the scow moves forward after it has been dumped, a mass of dead water remains and is drawn along both at the forward end and at the after-end of each closed compartment. These masses of dead water carry a quantity of floating material from which it is very difficult to thoroughly scour the compartments. According to my invention, I employ a forwardly inclined wall at the forward end of the forward compartment, the inclination of which prevents the accumulation of dead water along that wall, allowing the water to rise in the compartment in the form of a wave. The current passes backwardly in the same. By removing all cross partitions in the neighborhood of the water line, the current thus created passes back through all the compartments, and scours them. A corresponding opposite inclination of the after wall of the after compartment facilitates the outflow of the cleansing current under the after end of the scow, and prevents the accumulation of dead water with floating material in front of the rear wall of the after compartment.

In the accompanying drawings, Figure I, is a plan view of a dumping scow conveniently embodying my improvements. Fig. II, is a longitudinal sectional view. Fig. III, is a cross sectional view taken on line III, III, in Figs. I, and II.

In the said figures, 1, indicates a scow having a central opening which is divided into a double row of compartments 2, by means of a central bulk-head 3, and transverse partitions 4, which extend down to a level somewhat above the water level for no load, which is represented by the dotted wave 5, in Fig. II. Each of the compartments 2, is provided with trap doors 6, which are hinged at 7, to the sidewall 8, or the bulk-head 3. Cross beams 9, are located well below the water-level in line with the partitions 4, and support the ledges 10, against which the doors 6, rest when closed.

The trap doors 6, are operated by means of claims 11, which are attached to them at their swinging ends, and after passing over rollers 12, are wound upon the drums 13, on the shafts 15, which extend longitudinally over the top of the scow 1, and are supported within the bearings 16, on the partitions 4. The said shafts 15, may be driven either manually or by power. The forward wall 20, of the forward compartments 2, at the bow of the scow is provided with a marked forward inclination, at its lower portion commencing above the water level, as indicated at 21, in Fig. II. The after wall 22, of the stern end compartments is also provided with a similar opposite inclination 23. These inclinations coöperate with the openings below the partitions 4, in the region of the water line to permit the wave or current created by the inclination 21, to pass through all of the compartments and thoroughly scours them. The degree of inclination of the walls as described varies according to the speed of the scow and other factors, and is determined by experience. When the trap doors 6, are opened, the contents of the scow are dropped, leaving a certain amount of floating matter trapped within the bottoms of the compartment 2, due to the rise of the water therein. Owing to the motion of the scow and the provision of the inclinations thus described, this trapped matter is washed out by means of the current of water which is created by the motion of the boat, but which the inclinations 21, and 23, control or guide, so as to compel it to coincide with the displacement line, thus preventing the formation of any dead water. The current thus formed thoroughly scours the compartments from stem to stern. The dotted line shown in Fig. II, illustrates the cleansing wave as the scow is moved over the water.

Having thus described my invention, I claim:—

1. In a dumping scow, a dumping compartment, the forward wall of which is forwardly inclined toward the bottom of the scow.

2. In a dumping scow, a dumping compartment, the after wall of which is rearwardly inclined toward the bottom of the scow.

3. A scow having a central opening divided into a plurality of compartments connected below the water line for no load; the forward wall of the forward compartment being forwardly inclined toward the bottom of the scow, and each of said compartments being provided with a swinging bottom.

4. A scow having a central opening divided into a plurality of compartments, the transverse partitions between said compartments terminating above the water line for no load; said compartments being provided at their bottoms with doors; the forward wall of the forward compartment being forwardly inclined toward the bottom of the scow, and the after-wall of the after-compartment being rearwardly inclined toward the bottom of the scow, whereby the current of water created by the motion of the scow passes through all of the compartments and scours out all floating material therein.

In testimony whereof, I have hereunto signed my name, at Philadelphia, Pennsylvania, this sixteenth day of November, 1908.

WILLIAM W. ROBINSON.

Witnesses:
 JAMES H. BELL,
 E. L. FULLERTON.